(12) United States Patent
Shetty et al.

(10) Patent No.: US 8,390,148 B2
(45) Date of Patent: Mar. 5, 2013

(54) SYSTEMS AND METHODS FOR POWER SUPPLY WEAR LEVELING IN A BLADE SERVER CHASSIS

(75) Inventors: Sudhir Shetty, Cedar Park, TX (US); Ashish Munjal, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 230 days.

(21) Appl. No.: 12/191,084

(22) Filed: Aug. 13, 2008

(65) Prior Publication Data

US 2010/0038963 A1    Feb. 18, 2010

(51) Int. Cl.
*H02J 1/00* (2006.01)
(52) U.S. Cl. ............................................. 307/85; 713/300
(58) Field of Classification Search .................... 307/80, 307/52, 85; 713/300; 702/182
See application file for complete search history.

(56) References Cited

U.S. PATENT DOCUMENTS

| | | | | | |
|---|---|---|---|---|---|
| 4,638,175 | A * | 1/1987 | Bradford et al. | ................. | 307/64 |
| 5,324,989 | A * | 6/1994 | Thornton | ......................... | 307/35 |
| 6,144,115 | A * | 11/2000 | Massie et al. | ..................... | 307/80 |
| 6,285,150 | B1 * | 9/2001 | Adam et al. | ..................... | 318/471 |
| 6,643,128 | B2 * | 11/2003 | Chu et al. | ................. | 361/679.48 |
| 6,935,130 | B2 * | 8/2005 | Cheng et al. | ................. | 62/259.2 |
| 6,936,999 | B2 * | 8/2005 | Chapuis | ......................... | 323/282 |
| 7,019,416 | B2 * | 3/2006 | Sasaki | ............................. | 307/43 |
| 7,398,181 | B2 * | 7/2008 | Moore | .......................... | 702/182 |
| 7,692,329 | B2 * | 4/2010 | Abu Qahouq et al. | .......... | 307/14 |
| 7,991,588 | B1 * | 8/2011 | Krieger | ......................... | 702/186 |
| 2002/0171985 | A1 * | 11/2002 | Duffy et al. | ...................... | 361/90 |
| 2003/0056125 | A1 * | 3/2003 | O'Conner et al. | ............. | 713/300 |
| 2003/0139888 | A1 * | 7/2003 | Burns | ............................... | 702/63 |
| 2003/0172150 | A1 * | 9/2003 | Kennedy | ........................ | 709/224 |
| 2004/0062058 | A1 * | 4/2004 | Hann et al. | ........................ | 363/15 |
| 2005/0067902 | A1 * | 3/2005 | Bemat et al. | .................. | 307/140 |
| 2005/0071691 | A1 * | 3/2005 | Pomaranski et al. | ......... | 713/300 |
| 2005/0075837 | A1 * | 4/2005 | Espinoza-Ibarra et al. | ... | 702/182 |
| 2005/0162129 | A1 * | 7/2005 | Mutabdzija et al. | .......... | 320/116 |
| 2005/0174137 | A1 * | 8/2005 | DeVey | ........................... | 324/765 |
| 2006/0106553 | A1 * | 5/2006 | Melichar | .......................... | 702/63 |
| 2006/0133181 | A1 * | 6/2006 | Amano | ............................ | 365/229 |
| 2006/0248325 | A1 * | 11/2006 | Fung | ................................... | 713/1 |
| 2007/0018502 | A1 * | 1/2007 | Bazinet | ............................ | 307/80 |
| 2008/0052016 | A1 * | 2/2008 | Chapuis | ........................... | 702/60 |
| 2008/0054720 | A1 * | 3/2008 | Lum et al. | ....................... | 307/52 |
| 2008/0077817 | A1 | 3/2008 | Brundridge et al. | ........... | 713/340 |
| 2009/0138219 | A1 * | 5/2009 | Bletsch et al. | .................. | 702/60 |
| 2009/0158070 | A1 * | 6/2009 | Gruendler | ...................... | 713/340 |
| 2009/0282274 | A1 * | 11/2009 | Langgood et al. | ............. | 713/320 |

OTHER PUBLICATIONS

U.S. Appl. No. 12/254,628, "Power Supply Wear Leveling in a Multiple-PSU Information Handling System", Rahardjo, 25 pages, Oct. 20, 2008.
Merriam-Webster; "Store" by definition; www.merriam-webster.com/dictionary/store; Pgs. 3, Jul. 27, 2010.

* cited by examiner

*Primary Examiner* — Daniel Cavallari
(74) *Attorney, Agent, or Firm* — Baker Botts L.L.P.

(57) ABSTRACT

A method for wear leveling in an information handling system including multiple power supply units (PSUs) is provided. The method includes maintaining each PSU in one of multiple different operational states, collecting data relating to the use of each PSU, storing the collected data, and automatically changing the operational state of at least one of the PSUs based at least on the collected data regarding the use of each PSU in order to level the wear on the PSUs.

18 Claims, 5 Drawing Sheets

| Timeline | PSU1 | PSU2 | PSU3 | PSU4 | PSU5 | PSU6 |
|---|---|---|---|---|---|---|
| Week 1 | Online 336 KWh | Online 320 KWh | Online 345 KWh | Standby 0 KWh | Standby 0 KWh | Standby 0 KWh |
| Week 2 | Online 680 KWh | Online 650 KWh | Standby 345 KWh | Online 340 KWh | Standby 0 KWh | Standby 0 KWh |
| Week 3 | Standby 680 KWh | Online 920 KWh | Standby 345 KWh | Online 660 KWh | Online 340 KWh | Standby 0 KWh |
| Week 4 | Standby 680 KWh | Standby 920 KWh | Standby 345 KWh | Online 925 KWh | Online 600 KWh | Online 320 KWh |
| Week 5 | Standby 680 KWh | Standby 920 KWh | Online 670 KWh | Standby 925 KWh | Online 930 KWh | Online 670 KWh |
| Week 6 | Online 980 KWh | Standby 920 KWh | Online 980 KWh | Standby 925 KWh | Standby 930 KWh | Online 985 KWh |

*Figure 4*

SYSTEMS AND METHODS FOR POWER SUPPLY WEAR LEVELING IN A BLADE SERVER CHASSIS

TECHNICAL FIELD

The present disclosure relates in general to information handling systems, and more particularly to a method and system for power supply wear leveling in an information handling system, e.g., between power supply units in a blade server chassis.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system is a blade server, or simply "blade." Blades are often self-contained information handling systems designed specifically to allow the placement of multiple blades in a single enclosure or aggregation of enclosures. A blade enclosure or chassis may hold multiple blades and provide services to the various blades such as power, cooling, networking, interconnects, and management. For example, the chassis may include a plurality of power supply units configured to provide power to blades mounted in the chassis.

A blade server chassis may perform various non-core computing services. By locating these services in one place and sharing them between the blades, the overall utilization may be more efficient. One of these services includes supplying power to the blades and chassis. Information handling systems may operate over a range of DC voltages, yet power is typically delivered from utilities as AC, and at higher voltages than required by the computer. Converting the current from AC to DC may require one or more power supply units (PSUs). To ensure that the failure of one PSU does not affect the operation of the information handling system, blade servers may have one or more redundant PSUs. The PSUs of a blade chassis may provide a single power source for some or all blades within the chassis.

In certain blade chassis, it may be desirable to reduce PSU failure and/or accelerated failure. It may also be desirable to reduce the need for service calls and/or warranty costs in relation to system failures. Further, increased reliability and life expectancy may be desired in a blade chassis.

SUMMARY

In accordance with the teachings of the present disclosure, certain disadvantages and problems associated with power supply wear in information handling systems, such as for example blade server chassis, have been substantially reduced or eliminated.

In accordance with one embodiment of the present disclosure, a method for wear leveling in an information handling system including multiple power supply units (PSUs) is provided. The method includes maintaining each PSU in one of multiple different operational states, collecting data relating to the use of each PSU, storing the collected data, and automatically changing the operational state of at least one of the PSUs based at least on the collected data regarding the use of each PSU in order to level the wear on the PSUs.

According to another embodiment of the present disclosure, an information handling system includes at least one power supply unit (PSU), each PSU maintained in one of multiple different operational states, and a chassis management controller (CMC) coupled to each of the PSUs. The CMC is configured to collect data relating to the use of each PSU, and automatically change the operational state of at least one of the PSUs based at least on the collected data regarding the use of each PSU in order to level the wear on the PSUs.

According to another embodiment of the present disclosure, logic instructions for wear leveling in an information handling system including multiple power supply units (PSUs) are provided. The logic instructions are encoded in tangible computer readable media and executable by a processor. The logic instructions include instructions for maintaining each PSU in one of multiple different operational states; instructions for collecting data relating to the use of each PSU; instructions for storing the collected data; and instructions for automatically changing the operational state of at least one of the PSUs based at least on the collected data regarding the use of each PSU in order to level the wear on the PSUs.

At least one of the embodiments may provide an even wear on each PSU. This may further be provided based on utilization over time. At least one embodiment may prevent a PSU from being used more often than another related PSU. At least one embodiment may avoid failure and/or accelerated failure of a PSU within an information handling system. Such embodiments may reduce the need for service calls and/or warranty costs, be more reliable, and/or long life expectancy.

BRIEF DESCRIPTION OF THE DRAWINGS

A more complete understanding of the disclosed embodiments and advantages thereof may be acquired by referring, by way of example, to the following description taken in conjunction with the accompanying drawings, in which like reference numbers indicate like features, and wherein:

FIG. 4 illustrates an example table of an embodiment of a weighted criteria of collected PSU data used for wear leveling.

DETAILED DESCRIPTION

Preferred embodiments and their advantages are best understood by reference to FIGS. 1-5.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

For the purposes of this disclosure, a power supply unit (PSU) is a device or system that supplies electrical or other types of energy to an output load or group of loads. For example, a PSU for an information handling system may be a piece of hardware designed to convert AC power from the grid to low-voltage DC power outputs for internal components of the information handling system. As another example, a PSU may comprise a battery.

Figure 1:
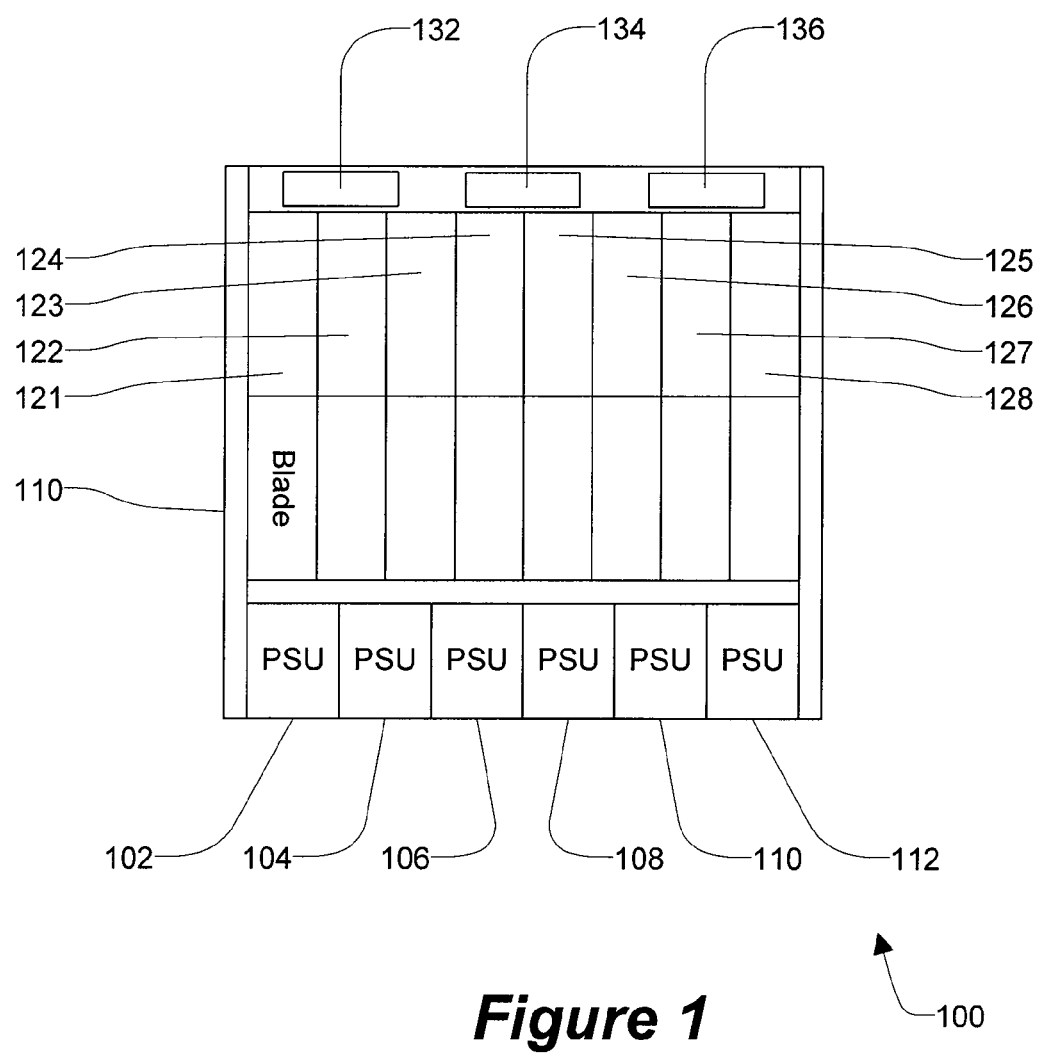
FIG. 1 illustrates an example embodiment a blade server chassis, in accordance with certain embodiments of the present disclosure.

FIG. 1 illustrates an example embodiment of a blade server chassis 100, in accordance with certain embodiments of the present disclosure. Chassis 100 may include, for example, a frame 110 and six PSUs 102, 104, 106, 108, 110, and 112. For clarity reasons, various components (e.g., fan modules and I/O modules) have not been illustrated in FIG. 1.

Chassis 100 may also include a first row of blades indicated at 121 to 128, a second row of blades (not numbered), and one or more Chassis Management Controllers (CMC) 132, 134, and 136, in the example embodiment illustrated in FIG. 1. These components, as well as the number of each component shown are merely examples; any suitable number of each type of component may be provided. Additional components may be included or omitted.

According to one embodiment, power for the blade server chassis or enclosure system may be provided by a set of PSUs 102, 104, 106, 108, 110, and 112 that may be installed in the blade server chassis. Each PSU 102, 104, 106, 108, 110, and 112 may be capable of delivering, for example, 2360 Watts of power to the system at, for example, 12 Volts DC. A PSU may take in single phase 180 to 264 V AC and convert it to 12 v DC to supply to components within the blade server system. A certain number of PSUs may provide enough power for a fully loaded blade server chassis; however, a blade server chassis may hold more PSUs to support redundant power modes. For example, in one embodiment three PSUs may provide enough power for a fully loaded blade server chassis, but six PSUs may be provided to support redundant power modes.

Power may be provided to the set of PSUs 102-112 from one or more Power Distribution Units (PDUs). The PDUs, in turn, may be provided power from a main AC power source or uninterruptible power source though the inlet cord of the PDU.

One or more CMCs may perform power monitoring and/or power management for the system. For example, power monitoring may provide functionalities such as reporting the real time AC power draw of the system, and/or reporting maximum and minimum AC power draw with a time stamp. For example, power management may provide functionalities such as managing and allocating the system power budget, ensuring sufficient power is available based on PSU population, redundancy status, redundancy configurations, system configuration, and/or any power limits set on the enclosure; allowing users to select required power redundancy mode; allowing users to optionally set a maximum AC power draw for the enclosure; allowing users to set a power priority for enclosure slots in the event that the CMC may need to reduce system power consumption; and/or managing Dynamic Power Supply Engagement.

According to certain embodiments, at least one CMC 132-136 may support a Dynamic Power Supply Engagement (DPSE) capability. This may be an optional mode, settable in the command line interface and/or graphical user interface of the CMC. The CMC may keep track of the overall power consumption within the system, the maximum potential power requirements of the servers and chassis infrastructure, and a user's requirements for power redundancy. With reference to the embodiment illustrated in FIG. 1, when the DPSE mode is activated, CMC 132, 134, and/or 136 can enable or place PSUs 102, 104, 106, 108, 110, and/or 112 in standby mode, as needed, in order to drive up utilization on the active supplies, thus optimizing the power efficiency of the PSUs. In addition, the CMC(s) in DPSE mode may implement different PSU redundancy configurations.

Figure 2:
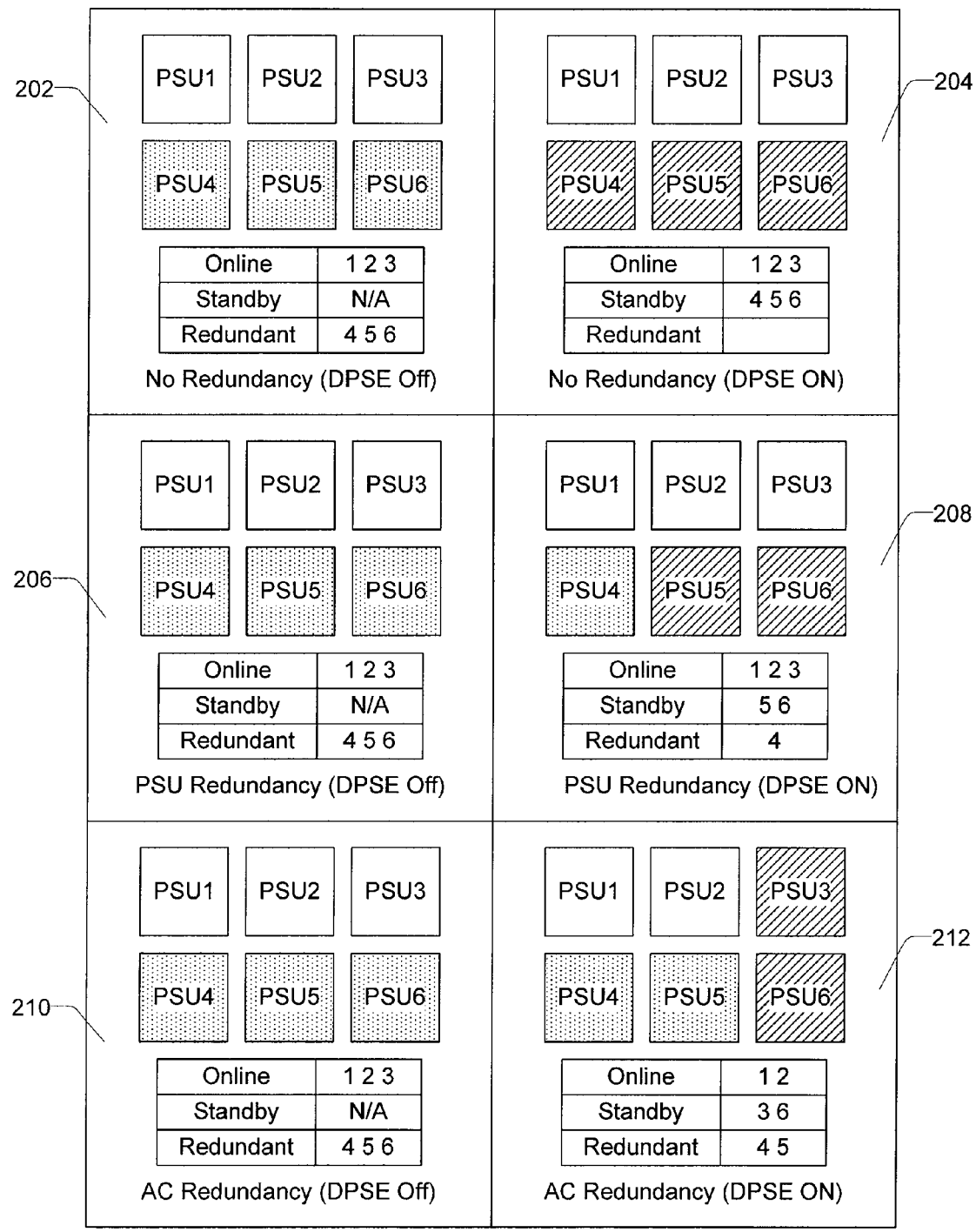
FIG. 2 illustrates examples of redundancy configurations in accordance with certain embodiments of the present disclosure.

FIG. 2 illustrates various different examples of PSU redundancy configurations that may be selected by a user, according to certain embodiment of the present disclosure. Six examples are shown: AC redundancy, PSU redundancy, and no redundancy, each redundancy with DPSE turned on or off. A PSU in an online mode may supply more or less power to components within a blade server chassis. A PSU in an standby mode may momentarily not supply power (e.g., turned off) but may be ready to be called upon, for example by a CMC, to supply more or less power to components within a blade server chassis or for leveling wear. A PSU in a redundant mode may momentarily not supply power (e.g., turned off) but may be used to back up a PSU that fails to supply power. In some embodiments the changing of the PSU states between these modes, for example between online and standby may allow for wear leveling between the PSUs within a blade server chassis.

A first example configuration (no redundancy with DPSE disabled) is indicated at 202 in FIG. 2. Six PSUs may be present and connected to AC power, with three PSUs 1-3 active (i.e., in an "active" or "online" state) and three PSUs 4-6 in a redundant state, with DPSE not enabled. A failure to any PSU 1-3 or AC grid in this configuration may result in one or more blades shutting down if the load requires the capacity of all three PSUs, because of the "no redundancy" configuration.

A second example configuration (no redundancy with DPSE enabled) is indicated at 204 in FIG. 2. In an example situation, three PSUs 1-3 may start out active with a load balanced across them, while three PSUs 4-6 may be in a standby mode. When the power draw stabilizes, the CMC may determine how many PSUs are required to power the configuration most efficiently with no redundancy. If the load requires only two PSUs to power the configuration, one additional PSU (for a total of four) may be put into standby mode. The CMC may automatically activate this PSU if the load subsequently increases. A failure to any PSU 1-3 or AC grid in this configuration may result in one or more blades shutting down if the load requires the capacity of all three PSUs, because of the "no redundancy" configuration.

A third example configuration (PSU redundancy with DPSE disabled) is indicated at 206 in FIG. 2. In an example situation, three PSUs 1-3 may start out active with a load balanced across them, while the remaining three PSUs 4-6 may be maintained in a redundancy state. Any of PSUs 4-6 in the redundancy state may be made active in the event of a PSU failure to any of the PSUs 1-3 as long as they are connected to AC power.

A fourth example configuration (PSU redundancy with DPSE enabled) is indicated at 208 in FIG. 2. In an example situation, four PSUs 1-4 may start out active with a load balanced across them, while the remaining two PSUs 5-6 (if connected to AC power) may be maintained in a standby mode. When the power draw stabilizes, the CMC may determine how many PSUs are required to power the configuration most efficiently while providing redundancy in the event of a failure to any of PSUs 1-4. If the load requires only two PSUs to power the configuration plus one more for redundancy, the fourth online PSU may be put into standby mode (and may be automatically re-activated if the load subsequently increases). Any of the PSUs in standby mode may be made active in the event of a failure to any of the active PSUs as long as they are connected to AC power.

A fifth example configuration (AC redundancy with DPSE disabled) is indicated at 210 in FIG. 2. In an example situation, all PSUs 1-6 may be active with the load shared across them. Three PSUs 1-3 may be connected to one AC grid and three PSUs 4-6 into another AC grid, thus ensuring that the loss of an entire AC grid or any three individual PSUs will not affect the operation of the blades. This may be a default mode for an example six PSU configuration.

A sixth example configuration (AC redundancy with DPSE enabled) is indicated at 212 in FIG. 2. In an example situation, all PSUs 1-6 may start out active with the load shared across them. When power draw stabilizes, the CMC may determine how many PSUs are required to power the configuration most efficiently and provide redundancy in the event of a grid failure. If the load requires, for example, only two PSUs 1 and 2 to power the configuration plus two others for redundancy 4 and 5, then two PSUs 3 and 6 may be put into standby mode. The CMC may re-activate them automatically if the load increases.

In some embodiments, server system 100 may include only one PSU. In such embodiments, further PSUs may be are added to the system at a later time. Embodiments of the present disclosure may allow such a system to level the use between the first PSU and the later added PSUs.

Several factors regarding the use of a PSU may contribute to the wear of the PSU, e.g., temperature, load, and/or diagnostic information. Examples factors that may cause PSU wear may include:

cumulative Mega Watts Hour (MWH) produced by a PSU over time;
energy consumption of a PSU over time;
peak ambient temperature (deg C) that a PSU was subject to;
average ambient temperature (deg C) of a PSU over time;
the number of power cycles experienced by a PSU; and the number of large power transitions in PSU output experienced by a PSU.

These factors are only examples and other factors may be considered. Further, the units of each factor may be freely selected, for example MWH or KWH, Fahrenheit or Celsius. Regarding the number of large power transitions experienced by a PSU, for the purposes of this disclosure, a "large transition" may be defined as a transition in output power of over 50% of the total output capability that occurs in less than one second. For example, if a PSU outputting 500 W at t=t0 increases to an output level of 750 W or higher at t=t0+1 s, the increase may be referred to as a large transition for that PSU.

A key measurable criteria that could be used to determine the load on a PSU is the cumulative power produced by the PSU over time. In general, the Mean Time Between Failure (MTBF) of a PSU is inversely proportional to the cumulative power produced by that PSU.

Figure 3:
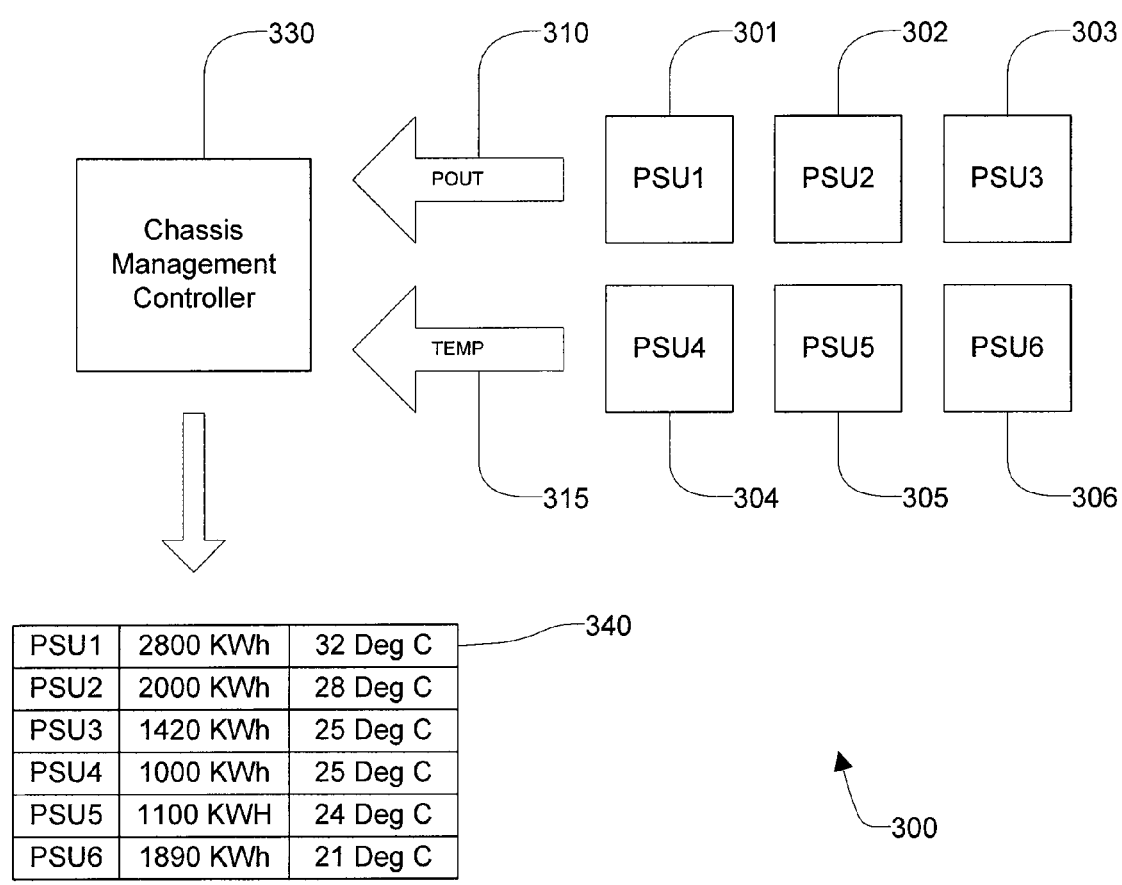
FIG. 3 illustrates an example embodiment for wear leveling of PSUs.

FIG. 3 illustrates an information handling system 300, such as a blade server system, providing wear leveling functionality, according to an example embodiment of the present disclosure. An example number of six PSUs 301-306 may form all or part of the power supply to various components of information handling system 300. A CMC 330 may collect $P_{OUT}$ data 310 (Power Output measurement in watts) using a Power Management (PM) Bus, e.g., PMBus Interface Revision 1.1 (over an I2C interface) from each PSU 301-306. CMC 330 may compute KWh (Kilowatt/hour) produced by each PSU 301-306 by averaging $P_{OUT}$ readings over a period of time, e.g., one hour (and may repeat every hour). The CMC 330 may additionally collect TEMP data (PSU temperature) 315 from each PSU 301-306.

CMC 330 may record the KWh produced by each PSU 301-306 and/or the temperature of each PSU 301-306, and may associate such data with identification information (e.g., Field Replaceable Unit FRU data) for each corresponding PSU. The resulting data produced by CMC 330, illustrated here in the form of a table 340, may be stored and used for wear leveling, as discussed below. In table 340, the first column represents identification information of each PSU 301-306, the second column indicates the power produced by each PSU 301-306, and the third column indicates the temperature of each PSU 301-306. In other embodiments, table 340 may only include a single column of data representing one factor contributing to PSU wear, or may include additional columns of such data, or combinations of data. In some embodiments, CMC 330 may periodically apply a weighting to at least portions of the data in table 340.

CMC 330 may adjust the power supply state of at least one of PSUs 301-306 based at least on such data shown in table and/or similar data, which may or may not be weighted, in order to level the wear on PSUs 301-306 over time.

As mentioned above, in some embodiments, the wear leveling may be done according to a criteria, for example a weighted criteria, of the collected data regarding each PSU. For example, a maximum or minimum value of the collected data may be identified and the power supply state of the PSU relating to that value may be changed. The power supply state of a PSU may be changed between any different operational states, e.g., between an active (or online) state and a standby state.

In some embodiments, the selected redundancy configuration for the system 100 (e.g., the configurations described above regarding FIG. 2, preferably the examples marked as 202, 208, and 212) may be factored into the determination of whether to change the state of particular PSUs. Thus, the determination of whether to change the state of particular PSUs may be based on (a) collected data regarding the use of particular PSUs and (b) the selected redundancy configuration for the system, according to any suitable algorithms and/or decision matrix or other decision process. Thus, in some embodiments, the CMC may periodically perform wear leveling by changing the power supply states (e.g., online or standby) of particular PSUs based on the collected data regarding the PSUs and the redundancy policy for the system (which policy may be user selected, configured by an administrator, automatically determined, or determined in any other suitable manner). In addition, the frequency for performing wear leveling may be based on user-configurable wear leveling frequency, e.g., a selected time period, exceeding a threshold for one or more parameters (e.g., certain collected data regarding the PSUs), or some combination.

FIG. 4 illustrates an example process of wear leveling, according to certain embodiments of the present disclosure. In this example, the power supply states of at least one PSU are changed (or at least determined whether to change) periodically, based on time, namely weekly. This may be taken from the first column in FIG. 4 marked "timeline." In this example, cumulative power produced by each PSU is used as an input for determining whether to change states of particular PSUs. The remaining six columns give examples of cumulative power produced by each PSU in KWh.

In this example, the power state of the PSU with the highest cumulative KWh at the end each week, as indicated in bold, is changed from online to standby for the subsequent week. For example, in week one PSU3 has the highest KWh, namely 345 KWh. Thus, PSU3 is switched PSU3 into a standby mode for week two. PSU3 may remain in the standby mode until PSU3 is called upon by the CMC to supply power. This wear leveling is repeated for each week. The result, as indicated at week six, may be that the cumulative power produced by each PSU may remain relatively similar.

In some embodiments, weighting criteria for weighting collected data used in determining whether to change PSU states may be defined by a user. For example, temperature data, load data, or diagnostic information, or a combination thereof, may be used to define the wear of a PSU. Each of such factors may be assigned a weighting for determining whether to change the states of particular PSUs.

Figure 5:
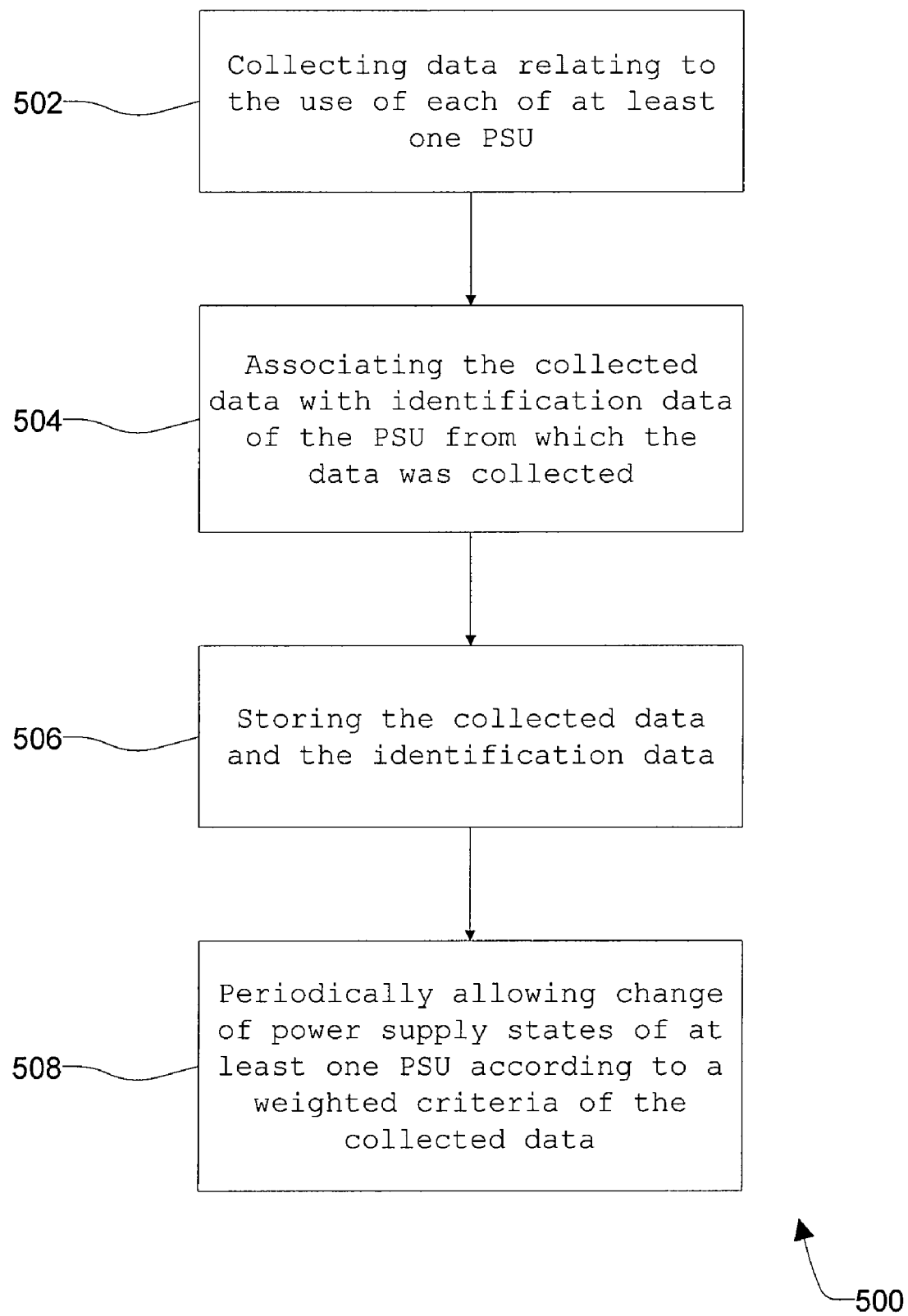
FIG. 5 illustrates a flow chart of an example method for wear leveling PSUs, according to certain embodiments of the present disclosure.

FIG. 5 illustrates a flow chart of an example method for leveling use of at least one PSU, according to certain embodiments of the present disclosure.

According to one embodiment, method 500 preferably begins at step 502. As noted above, teachings of the present disclosure may be implemented in a variety of configurations of system 300. As such, the preferred initialization point for method 500 and the order of the steps 502-508 comprising method 500 may depend on the implementation chosen. For example, steps 504 and 506 may be partly performed at the same time or in any order.

At step 502, data relating to the use of each of the at least one PSU in the information handling system is collected. For example, a PM bus interface may be used for collecting this data.

At step 504, the collected data may be associated with identification data of the PSU from which the data was collected. This may be performed by a CMC using the PM bus.

At step 506, the collected data and the identification data may be stored. This may be performed, for example, by the CMC. The data may be stored in a memory within the CMC or another component of the information handling system.

At step 508, the CMC may automatically change (or at least determine whether to chance) the operational state of at least one of the PSUs based at least on (a) the collected data regarding the use of each PSU, (b) weightings assigned to particular factors (e.g. types of collected data), and/or (c) the current redundancy policy for the PSU system.

Steps 502-508 may be performed periodically, or upon triggering by some event (e.g., a certain measured parameter such as produced power or temperature exceeding a predefined threshold value).

Although FIG. 5 discloses a particular number of steps to be taken with respect to method 500, method 500 may be executed with more or less steps than those depicted in FIG. 5. In addition, although FIG. 5 discloses a certain order of steps to be taken with respect to method 500, the steps comprising method 500 may be completed in any suitable order. Method 500 may be implemented using system 300 or any other system operable to implement method 500. In certain embodiments, method 500 may be implemented partially or fully in software or firmware embodied in tangible computer-readable media.

Using the wear leveling techniques discussed herein, PSU failure and/or accelerated system failure may be reduced, and a more even wear of the PSUs may be achieved, in certain embodiments. In addition, the reliability of an information handling systems may be improved, and the need for service calls and/or warranty costs may be reduced.

Using the methods and systems disclosed herein, certain problems associated with power supplies for information handling systems, such as for example blade server systems may be improved, reduced, or eliminated.

Although the present disclosure has been described in detail, it should be understood that various changes, substitutions, and alterations can be made hereto without departing from the spirit and the scope of the disclosure as defined by the appended claims.

What is claimed is:

1. A method for wear leveling in an information handling system including multiple power supply units (PSUs), the method comprising:
    maintaining each PSU in one of multiple different operational states;
    collecting data relating to the use of each PSU, wherein the collected data includes at least one of:
        temperature data including at least one of (a) peak ambient temperature for each PSU and (b) average ambient temperature for each PSU; and
        diagnostic data including at least one of (a) a count of a number of power cycles and (b) a count of a number of large power transitions for each PSU;

storing the collected data on a non-transitory computer-readable medium; and automatically changing the operational state of at least one of the PSUs based at least on the stored collected data regarding the use of each PSU in order to level the wear on the PSUs.

2. A method according to claim 1, wherein the collected data relating to the use of each PSU is averaged over a period of time.

3. A method according to claim 1, comprising automatically changing the operational state of at least one of the PSUs based at least on:
   (a) the collected data regarding the use of each PSU in order to level the wear on the PSUs; and
   (b) a redundancy policy selected for the multiple power supply units.

4. A method according to claim 3, further comprising receiving a user selection of a redundancy policy for the multiple power supply units from multiple different redundancy policies including at least one of (a) an AC redundancy policy, (b) a PSU redundancy policy, and (c) no redundancy policy.

5. A method according to claim 1, wherein the multiple different operational states include an "online" state and a "standby" state.

6. A method according to claim 1, further comprising:
   weighting the collected data relating to the use of each PSU based on selected weighting criteria; and
   wherein automatically changing the operational state of at least one of the PSUs based at least on the collected data regarding the use of each PSU comprises automatically changing the operational state of at least one of the PSUs based at least on the weighted collected data.

7. An information handling system, comprising:
   at least one power supply unit (PSU), each PSU maintained in one of multiple different operational states; and
   a chassis management controller (CMC) coupled to each of the PSUs and configured to:
      collect data relating to the use of each PSU and store such data on a non-transitory computer-readable medium, wherein the collected data includes at least one of:
         temperature data including at least one of (a) peak ambient temperature for each PSU and (b) average ambient temperature for each PSU; and
         diagnostic data including at least one of (a) a count of a number of power cycles and (b) a count of a number of large power transitions for each PSU; and
      automatically change the operational state of at least one of the PSUs based at least on the stored collected data regarding the use of each PSU in order to level the wear on the PSUs.

8. An information handling system according to claim 7, wherein the collected data relating to the use of each PSU is averaged over a period of time.

9. An information handling system according to claim 7, wherein the CMC is configured to change the operational state of at least one of the PSUs based at least on:
   (a) the collected data regarding the use of each PSU in order to level the wear on the PSUs; and
   (b) a redundancy policy selected for the multiple power supply units.

10. An information handling system according to claim 9, wherein the CMC is further configured to receive a user selection of a redundancy policy for the multiple power supply units from multiple different redundancy policies including at least one of (a) an AC redundancy policy, (b) a PSU redundancy policy, and (c) no redundancy policy.

11. An information handling system according to claim 7, wherein the multiple different operational states include an "online" state and a "standby" state.

12. An information handling system according to claim 9, wherein the CMC is further configured to:
   weight the collected data relating to the use of each PSU based on selected weighting criteria; and
   automatically change the operational state of at least one of the PSUs based at least on the weighted collected data regarding the use of each PSU.

13. Logic instructions for wear leveling in an information handling system including multiple power supply units (PSUs), the logic instructions encoded in non-transitory tangible computer readable media and executable by a processor, comprising:
   instructions for maintaining each PSU in one of multiple different operational states;
   instructions for collecting data relating to the use of each PSU;
   instructions for storing the collected data on a non-transitory computer-readable medium, wherein the collected data includes at least one of:
      temperature data including at least one of (a) peak ambient temperature for each PSU and (b) average ambient temperature for each PSU; and
      diagnostic data including at least one of (a) a count of a number of power cycles and (b) a count of a number of large power transitions for each PSU; and
   instructions for automatically changing the operational state of at least one of the PSUs based at least on the stored collected data regarding the use of each PSU in order to level the wear on the PSUs.

14. Logic instructions according to claim 13, comprising:
   instructions for automatically changing the operational state of at least one of the PSUs based at least on:
   (a) the collected data regarding the use of each PSU in order to level the wear on the PSUs; and
   (b) a redundancy policy selected for the multiple power supply units.

15. Logic instructions according to claim 13, wherein the multiple different operational states include an "online" state and a "standby" state.

16. Logic instructions according to claim 13, comprising:
   instructions for weighting the collected data relating to the use of each PSU based on selected weighting criteria; and
   instructions for automatically changing the operational state of at least one of the PSUs based at least on the weighted collected data regarding the use of each PSU.

17. Logic instructions according to claim 13, wherein the collected data relating to the use of each PSU is averaged over a period of time.

18. A method for wear leveling in an information handling system including multiple power supply units (PSUs), the method comprising:
   maintaining each PSU in one of multiple different operational states, wherein the multiple different operational states include an "online" state and a "standby" state;
   collecting data relating to the use of each PSU, wherein the collected data relating to the use of each PSU is averaged over a period of time and includes at least one of:
      temperature data including at least one of (a) peak ambient temperature for each PSU and (b) average ambient temperature for each PSU; and diagnostic data including at least one of (a) a count of a number of power cycles and (b) a count of a number of large power transitions; and weighting the stored collected data relating to the use of each PSU based on selected weighting criteria;

receiving a user selection of a redundancy policy for the multiple power supply units from multiple different redundancy policies including at least one of (a) an AC redundancy policy, (b) a PSU redundancy policy, and (c) no redundancy policy;

automatically changing the operational state of at least one of the PSUs based at least on:
  (a) the weighted stored collected data regarding the use of each PSU in order to level the wear on the PSUs; and
  (b) the selected redundancy policy for the multiple power supply units.

\* \* \* \* \*